Figure 1:
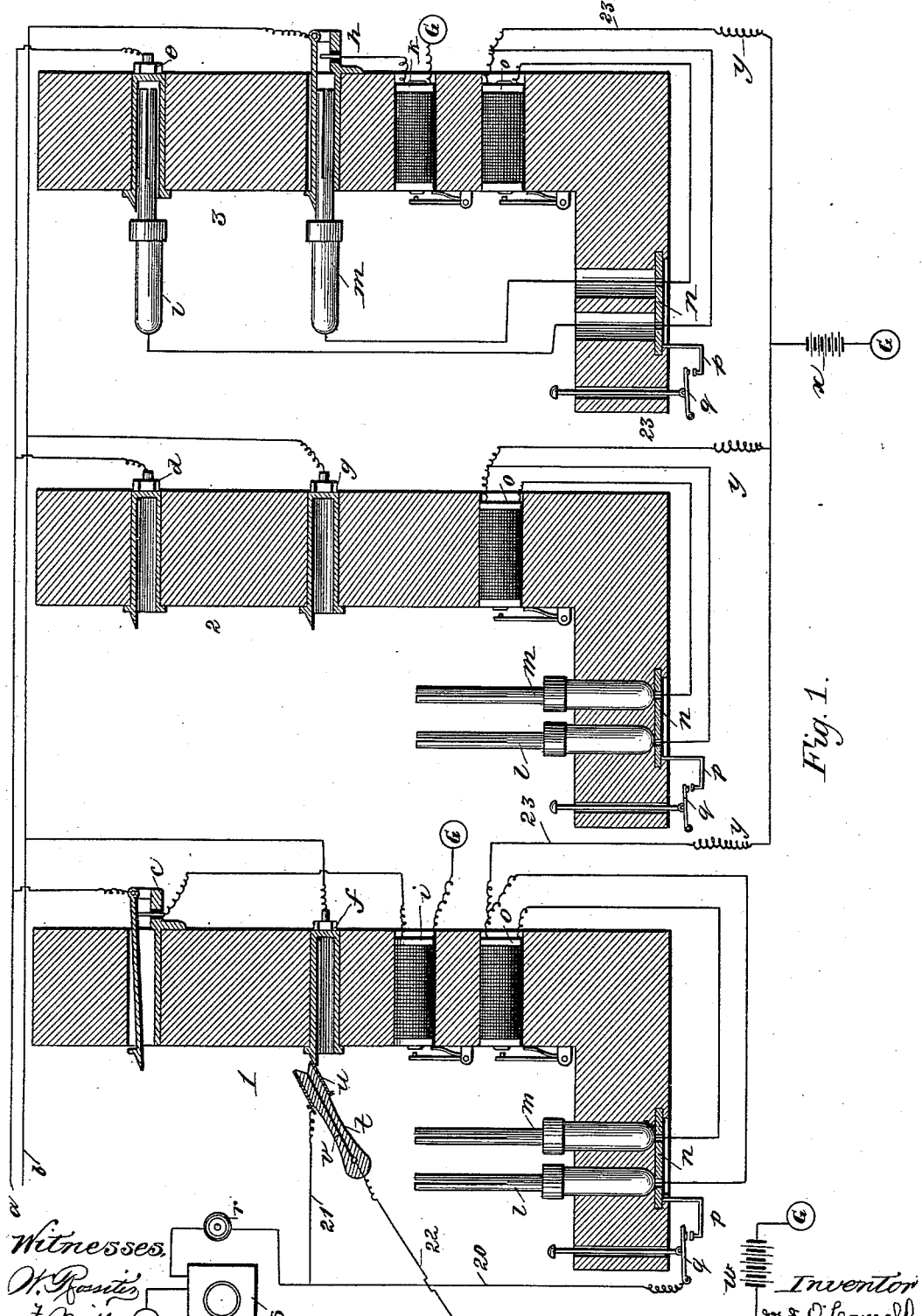

(No Model.) 2 Sheets—Sheet 1.

J. J. O'CONNELL.
TESTING APPARATUS FOR TELEPHONE EXCHANGE SWITCHES.

No. 420,091. Patented Jan. 28, 1890.

Witnesses
Inventor
Jos. J. O'Connell

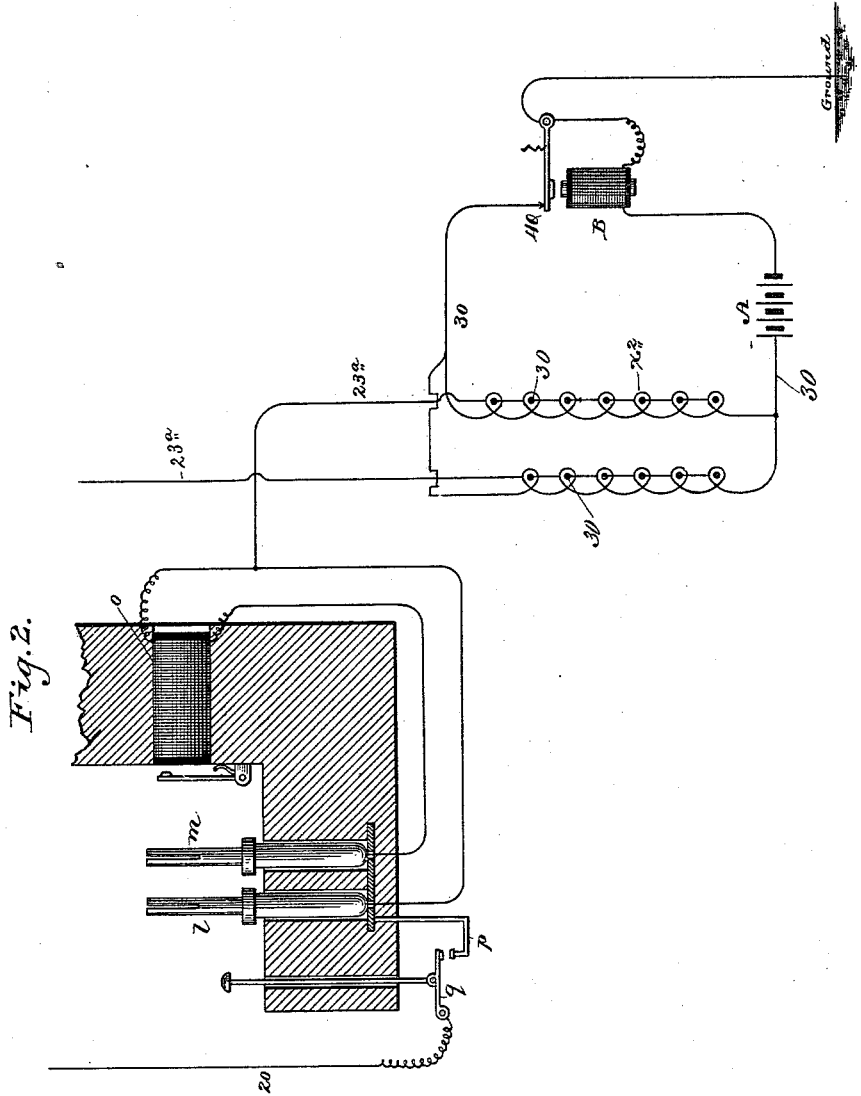

UNITED STATES PATENT OFFICE.

JOSEPH JOHN O'CONNELL, OF CHICAGO, ILLINOIS.

TESTING APPARATUS FOR TELEPHONE-EXCHANGE SWITCHES.

SPECIFICATION forming part of Letters Patent No. 420,091, dated January 28, 1890.

Application filed June 6, 1887. Serial No. 240,473. (No model.)

*To all whom it may concern:*

Be it known that I, JOSEPH JOHN O'CONNELL, a resident of Chicago, in the county of Cook and State of Illinois, have invented certain new and useful Improvements in Testing Apparatus for Telephone-Exchange Switches, of which the following is hereby declared to be a full, clear, and exact description, sufficient to enable others skilled in the art to make and use the same.

In the multiple switch-boards of telephone-exchanges the subscribers' lines are in closed connection with each board of the series, the annunciators, however, pertaining to the several lines being usually distributed in sets or subdivisions at the different boards and there grounded, so that the operator at any given board has before her only the drops of those lines the calls from which are assigned to her board. By this arrangement the operator in response to a drop-call coming from any one of the lines allotted to her charge may ascertain what line it is with which connection is desired, and because in the construction named all of the subscribers' lines have terminals at each board of the multiple series the operator would be able ordinarily by plug-switch or like appliance to establish circuit at once with the terminal of the particular line to which the call is directed; but, as frequently happens, such line may be then in use through some other board of the set beyond her observation and quite unknown to the operator, so that on "going in" with the switch device she would break and interrupt a closed connection already established. To avoid this inconvenience provision has been made whereby the operator without disturbing the circuit existing may ascertain the fact that the desired line is busy, although its connection has been made at some multiple board other than that which she attends. To make this preliminary test the several terminals of each subscriber's line located in the various boards of the multiple set have heretofore been connected together by a normally-open supplemental circuit. The spring-jack switch-seat at each terminal had its contact point and spring constituting the line-connection insulated from the body of the switch-seat, and it was through the switch-seat bodies of the terminal series thus isolated that the supplemental circuit was established. In each operator's telephone-outfit a test-battery was arranged directly in circuit with the receiving-telephone of the outfit. Upon applying one of the switch-connecting plugs to the body of the spring-jack switch-seat pertaining to the line to be called all of the switch-seat bodies in the branch terminals of such line were established through the supplemental circuit in connection with the test-battery of the telephone-outfit. Hence if such line were already in use through some other board of the set than that of the operator an electric impulse from her test-battery would pass through the receiving-telephone of the outfit and by the connecting-plug and supplemental circuit to the line-terminal in use, thence to line, and so to ground at the subscriber's station, imparting a "click-signal" to the receiving-telephone of the outfit, as well understood. The presence of the battery in direct circuit with the operator's outfit and with the ear-phone thereof made it necessary to employ spring-jack switch-seats or the like at each branch terminal of the series in supplemental circuit, for if attempt were made to dispense with the spring-jacks and to substitute the plain switch-seat instead, the isolation of the line-circuit from the normally-open circuit between the switch-seat bodies of the series would no longer exist. The spring and contact point for the line-circuit being gone, the entire switch-seat body in each branch terminal would at once be established with ground through the subscriber's annunciator-drop. On testing with the switch-connecting plug at any one of the branch terminals the electric impulse from the battery in the operator's outfit would pass to ground through the subscriber's drop, producing the click-signal, and this, too, whether the particular line was then in use or not. Manifestly the testing operator could not tell if the line were free or busy, while the operator having charge of the subscriber's drop would be constantly confused by false calls resulting from the preliminary rings at some one or more of the branch terminals. Spring-jacks or like appliances serving to isolate the line-circuit of the multiple terminals from the normally-open supplemental circuit between such terminals, as described, are comparatively expensive to make and troublesome to keep in order.

It is the object of my invention to materially reduce this cost in the construction and maintenance of multiple switch-boards; and to that end the invention consists in the improvements in such boards presently to be described, whereby the spring-jacks are in large part replaced by plain switch-seats, while the test-battery is removed from as circuit of the telephone-outfit to that of the connecting-plugs or switching appliances, and is so organized with the other parts in combination as to prevent the false click signals and calls which in the old relation of the test-battery would follow the use of plain switch-seat terminals. Since the first cost of multiple boards fitted with spring-jacks and with plain switch-seats, respectively, is about as ten to one, it is plain that upon boards of any considerable size the saving obtained by my invention is a very important item.

In the accompanying drawings, forming part of this specification, Figure 1 is a conventional view of a multiple switch-board and its connections organized in accordance with my invention. Fig. 2 is a modified construction similar to Fig. 1, (showing only one section of the multiple board,) and displaying the plan for using a derived or secondary current to effect the click test.

In Fig. 1 the numbers 1 2 3 designate three multiple switch-boards, and $a$ and $b$ are two telephone-lines, branched as shown, and having switch-terminals $c\ d\ e$ and $f\ g\ h$, respectively, in the several sections of the multiple board. It will be seen that the branch terminals of each telephone-line—for example, $a$ in the section-boards of the multiple series—are all plain switch-seats $d\ e$, excepting only the single spring-jack $c$, which is connected with the annunciator-drop $i$ at that operator's board having calls from the line-wire $a$ in charge.

The operator's telephone-outfit and testing appliances are shown only at board 1, although it will be understood that in practice each section-board of the set is furnished in the same way. The terminal plugs $l\ m$ of the pair of flexible connecting-cords rest in contact with the common metallic connecting-piece $n$. The clearing-out annunciator $o$ is included in the circuit of the cords in the usual manner. A leg $p$ and button-key $q$ serve to establish the telephone-outfit at will in circuit with the terminal-plugs.

The operator's receiving-telephone $r$ and transmitter $s$ are connected, as at 20, with the button-key $q$, and as at 21 with the metal ferrule or thimble $u$ of the test-plug $t$. The body of the test-plug $t$, which is of gutta-percha or the like, receives the metal strip or rod $v$, connected up by 22 with the calling battery or generator $w$ of the operator's outfit. It will be seen that the subscriber's drop-annunciators $i\ k$ are separately grounded at the switch-boards to which they severally belong. These annunciators are wound of high resistance, for a purpose to be presently explained, or, if left normally low, a supplemental coil, serving to furnish the resistance desired, may be interposed between each of the individual annunciators and its ground-connection. The electric impulses necessary to produce the click-signal in the receiving-telephone $r$ of the operator's outfit may be preferably derived from a common source, as at $x$, and be distributed thence to each of the section-boards by the connections 23, which latter terminate in the clearing-out annunciators $o$, or are elsewhere joined to the circuit of the switching appliances $l\ m$. A rheostat $y$ or other high resistance is ordinarily interposed at some convenient point in each connection 23 between the circuit of the switching appliances $l\ m$ and the source of the electric impulses at $x$. Notwithstanding this provision the current proceeding from the battery $x$ is always sufficient to overcome the resistance $y$, so that there is a constant flow by connection 23 onto the switch-circuit $l\ m$. When distant stations are connected up through the exchange by the plugs $l\ m$, as in the act of talking, the resistance $y$ then comes into play and practically prevents the station currents from escaping at the exchange through the switches $l\ m$, connection 23, and battery $x$ to ground; but if there is no direct ground-exit at such point—that is, if instead of a battery located as at $x$ and there grounded the electric impulses necessary to effect the click-signal be thence derived, as will presently appear, from a dynamo or other inductive source—then the resistance-coil $y$ need no longer be interposed. The isolation in circuit essential to the production of the secondary or derived impulse for signaling suffices under such conditions to prevent the escape of the voice-currents. These have no outlet by switches $l\ m$ and connection 23, as when battery $x$ is employed in primary circuit therewith, and in consequence the coil $y$ has no function to perform in resisting the grounding of the station-currents.

Assuming the parts to be in the position shown by the drawings, it is evident that the telephone-lines $a\ b$ are connected at board 3 through their line-terminals $e\ h$ and the circuit of the switch-plugs $l\ m$ and clearing-out annunciator $o$. Under such condition a constant current passes from the test-battery or its equivalent at $x$ by connection 23 to the switch-circuit $l\ m$ of the section-board 3, and thence by terminals $e\ h$ along each of the telephone-lines $a\ b$ to ground at the subscribers' stations. This battery-current is so feeble in character as not to interfere with the regular working of the telephone-lines, and is not sufficient to overcome the high resistance presented by the individual drop-annunciators $i\ k$ and their ground-connection when these are closed to the telephone-lines through their spring-jacks c h, &c. If, however, the operator, for example, at multiple board 1 applies the thimble u of test-plug t to the lip of the terminal switch-seat f, as shown, then the test-current from battery x, flowing to the telephone-line b, instead of being grounded at the distant station, is short-circuited through the branch terminal of the telephone-line b, joined to the switch-seat f, passing thence by thimble u and connection 21 through the ear-phone r and transmitter s to ground, and thus effecting the click-signal in the receiver r of the operator's outfit. The operator is thus apprised of the fact that the telephone-line b is already in use, and will not go in or break the talking-circuit existing. The same click-signal would be produced if the operator had applied the test-plug to the terminal switch-seat c at board 1, belonging to the telephone-line a, since, as already explained, the electric impulses from the battery or other source at x flow constantly to line and to ground at the subscriber's station along each telephone-circuit established in connection with any one of the line-terminals at any of the multiple section-boards. If, now, it be assumed that the plug-switches l m at switch-board 3, instead of being mounted in the switch-seats, are left at rest upon the common connecting-piece n, as in section-boards 1 and 2, and a call comes to the exchange from over the telephone-line a, the signal e is transmitted through the spring and contact of the jack switch-seat c and by annunciator-drop i to ground. The electric impulses in signaling from the distant station are sufficient to overcome the resistance of the individual annunciator i, so that the drop in each of such annunciators falls and informs the operator which telephone-line it is that calls. She may go in upon the line a by pressing the test-plug t against the line-terminal c, or by raising one of the switch-plugs l m from its seat, inserting it in the switch-seat c, and pressing the button-key q against the leg p. In either event the spring of the jack is raised from its contact-point, cutting the individual annunciator i out from connection with the line-wire a, which latter by the same operation is furnished with an outlet by connection 21 or 20, as the case may be, through receiver r and transmitter s to ground. The operator's outfit being thus established in circuit with the individual line a, the operator may thereupon learn from the subscriber what connection is desired. Ordinarily it would be convenient to employ one of the switch-plugs l m in establishing the connection between the operator and the subscriber calling, because the plug may remain in position in the switch-seat in readiness to complete the circuit through the exchange to the subscriber to be called when such connection is finally established. In order to ascertain whether the line called is then busy, the operator at the section-board applies thimble u of test-plug t to the casing of the line-terminal—as at f, for example—and if the telephone-line b were then busy the operator would immediately receive the click-signal, as already explained, by reason of the electric impulses from battery x being short-circuited from the telephone-line b through the branch terminal f and test-plug t and by operator's outfit to ground. If no such click-signal were given, the operator would know that the telephone-line b was free, and would then apply the metallic connection v of the test-plug t to the terminal f. By this means the electric impulses from the operator's calling-battery w would pass by connection 22, rod v, switch-terminal f, and telephone-line b to ground through the calling bell or signal at the subscriber's station. Immediately after transmitting such signal the operator can raise the remaining switch-plug l m from its seat at section-board 1 and insert the same into the body of the terminal, as at f, thus establishing the circuit between the distant subscribers through the branch terminals and switch-plug connections of the section-board.

It will be understood that in signaling a subscriber having a spring-jack terminal—as at c, for example—the current from the operator's calling-battery, which passes to line through the rod v of the test-plug t, is not sufficient to overcome the resistance presented by the coils of the individual annunciator i, so that the current from the calling-battery proceeds to the distant station without being grounded until it reaches that point.

The high resistance of the annunciator i will indeed prevent the premature grounding of the calling-current at the exchange quite as well even though plain line-terminals be used instead of spring-jacks. In other words, the presence of these latter is not essential to the working of the system; but by being used to the limited extent proposed the jack serves to cut out the individual annunciator i in establishing a talking-circuit and so far lessens the leak of voice-currents and improves the articulation.

When the subscribers' lines are in closed circuit, as shown at multiple board 3, one of the line-wires will be grounded through its individual annunciator, as at i. This provision affords an outlet for the discharge of residual or leak impulses while conversation is proceeding between the distant subscribers, and by reason of such discharge tends to keep the telephone-lines clear and to improve the distinctness of articulation at the subscribers' instruments.

Instead of having a single test-battery at x in common with all the switch-plugs of the several multiple boards, it is manifest that the switches of each section-board may have a common battery, or this latter be otherwise distributed, observing merely the precaution that each set of the connecting-plugs or like switching appliances be included in circuit with a test battery or cell distinct from the operator's-outfit circuit, which includes the telephone-transmitter.

The use of a secondary current (as from a dynamo or other inductive source) in lieu of the battery $x$ to effect the click-signal involves no essential change in structure or organization of parts.

As appears from Fig. 2, the section-board, with its several appliances, its switch-plugs, and terminals, &c., remains exactly the same. The only exception is that the branch connections 23, instead of leading directly from a battery, as at $x$, serve as conductors for an induced current only.

In conventional form Fig. 2 displays a battery, as at A, included in circuit with a simple rheotome-magnet B and its armature and with the induction-coil 30. A contact-piece, as at 40, against which said armature normally rests, closes the connection. Each separate branch $23^a$, leading from the circuit of the several switch-plugs $l\,m$, is insulated from but lies within the field of the induction-coil 30.

In practice it is simply necessary to intertwine the several branches $23^a$ in coil with the bobbin constituting the primary or battery coil 30, each branch $23^a$ being left free (i. e., disconnected) at one side, and all of the branches being properly insulated from each other and from the primary coil as well. A complete metallic circuit exists, which includes battery A, rheotome-magnet and armature B, and the primary bobbin 30, said circuit being rapidly established and broken by means of the vibrating armature of magnet B, which, through the medium of its retraction-spring, normally rests against the contact-piece 40 to close the circuit, and immediately thereafter is drawn away against the pull of its spring (breaking the circuit) by reason of the superior attractive force of the magnet. The magnet is sensitized to attract its armature only while the flow of current continues. When such current is broken by shift of the armature from contact 40, a static discharge occurs, the same escaping through ground-connection of the rheotome-magnet on one side and at the opposite by primary coil 30 across and through the secondary coils $23^a$ of the induction-bobbin to the circuit of the switch appliances. The high tension of the current permits this cross discharge to occur between the primary and secondary coils 30 $23^a$ despite the insulation, although this latter suffices to prevent the possible grounding of the battery A through the branches $23^a$ on one side and the ground-connection of the rheotome-magnet B at the opposite, which, except for such insulation, might readily occur. The static discharge or inductive effect is of course not manifest unless there is a ground-exit beyond the branches $23^a$—that is to say, unless some one of the switch appliances is connected to line and thence by distant station to ground; but under such circumstances the static discharge develops and furnishes (inductively) each branch $23^a$ with a practically constant current sufficient to effect the click-signal if the operator crosses any line which is already connected up with such branch through its switch-plug circuit.

The make and break at the rheotome-magnet B develops in consequence a derived or secondary impulse in the several branches $23^a$, which proceeds thence constantly by switch-plug circuit $l\,m$ to line and to the distant station or to the operator's ear-phone, as the case may be. In short, the terminals of the branches $23^a$, acting in conjunction with the primary coils 30 and their connections, establish at $x^2$ the equivalent for the battery $x$, the only difference being in the character of the current, which is derivative instead of being direct; but this, manifestly, is of no moment in effecting the signal-test.

The induced current might be developed by other means than as shown by Fig. 2. As already remarked, it will now be apparent that in operating with the derived current the presence of the resistance-coil $y$, Fig. 1, can be dispensed with. Inasmuch as the branches $23^a$ are without direct ground-exit, it becomes no longer necessary to guard against the short-circuiting of the voice-currents from the subscribers' stations, which ordinarily is apt to occur at the exchange through branch 23 and battery $x$ unless the resistance $y$ be interposed; and yet, although the branches $23^a$ are sufficiently isolated to prevent the short-circuiting of the station voice-currents, (connected up through the exchange,) the proximity of said branches to the coils of the inductor 30 is near enough, nevertheless, to furnish outlet there by cross-discharge through said coils and armature of relay B to ground for one side of the derived click-signal current. At the other side such current discharges through the operator's ear-phone or at the distant station, as previously detailed. It thus appears as a distinguishing feature of the invention (whether the resistance $y$ be present or absent) that the click current, derived or primary, is not only connected up with the circuit of the switch set, but is practically grounded on one side by a branch leading from the source of the electric impulses.

It has been proposed heretofore to locate a signal-battery in circuit with the set of switch-plugs; but the battery was looped in and had no ground branch, as designed by me. There was no current from the test-battery until both stations were in closed circuit through the exchange. The stations were depended upon to ground the sides of the battery. With one station still unconnected, a second operator attempting to make the "busy test" would get no result and would conclude that the line was free, and on going in might perhaps break a connection just established or cause confusion otherwise. This difficulty is entirely avoided by my invention, because with the ground branch in play the signal-current flows to line the moment that any subscriber's station is in exchange-connection, and such current is immediately short-circuited by busy test of another operator, whether the second-station connection be then completed or not. For like reason such earlier apparatus with test-battery in loop with the switch-plugs could not be used on metallic circuits. The battery being without ground branch, but on the contrary in loop with the plugs and eventually with the line-circuit, it is impossible to cross the line by the operator's outfit so as to derive the test-signal therefrom; but with one side grounded, as in my device, the metallic circuit is crossed and short-circuited by the test-outfit (if applied) immediately that the signal-battery is switched onto the line.

Other differences of high practical value might be noted, and which distinguish my invention from the prior scheme referred to; but the foregoing will suffice to establish the advantages in operation possessed by my system.

Having thus described my invention, what I claim as new, and desire to secure by Letters Patent, is—

1. In testing apparatus for telephone-exchanges, the combination, with the telephone-line and its terminal, of the separate switch appliance therefor, a test-battery having a ground branch and on its opposite side being connected up with said separate switch and through it to line when such line is closed by the switch for conversation, and the operator's receiver having independent switch-connection with the telephone-line, substantially as described.

2. In testing apparatus for telephone-exchanges, the combination, with the section-boards and with the multiple terminals of each station-line connected together in a set, of the switches for said terminals, a test-battery common to all the switches of the group, having a ground branch and on its opposite side being connected up with said switches and through any of them to line when the latter is closed by the switch for conversation, and the operator's receiver having independent connection with the telephone-line, substantially as described.

3. In testing apparatus for telephone-exchanges, the combination, with the section-boards and with the station-lines each having multiple terminals connected together in a set, of the terminal switches arranged in pairs, a test-battery for the several switches, having a ground branch and on its opposite side being connected up with said switches and through either of them to line when the latter is closed by the switch for conversation, and the operator's receiver having independent switch-connection with the telephone-line, substantially as described.

4. In testing apparatus for telephone-exchanges, the combination, with the section-boards and with the station-lines each having multiple terminals connected together in a set, of the connecting-cords with switch-plugs arranged in pairs, a test-battery for the several switches, having a ground branch and on its opposite side being connected up with said switches and through either of them to line when the latter is closed by the switch for conversation, and the operator's receiver having independent switch-connection at any terminal of the station-lines, substantially as described.

5. In testing apparatus for telephone-exchanges, the combination, with the section-boards and with the station-lines each having multiple terminals connected together in a set, of the connecting-cords with switch-plugs arranged in pairs, a test-battery for the plugs of each line set, said battery having a ground branch and a resistance interposed between the battery and the switch-plugs and being closed to line through any of said plugs, and the telephone-receiver provided with independent switch-connection at any terminal of the station-lines, substantially as described.

6. In testing apparatus for telephone-exchanges, the combination, with the section-boards and with the station-line having multiple terminals connected together in a set, of the individual drop for said line, having high resistance, connecting-cords with terminal plugs arranged in pairs, a test-battery connected up with said plugs and closed to line through any one of them and having a ground branch, and the telephone-receiver having independent switch-connection with the line-terminals, substantially as described.

7. In testing apparatus for telephone-switches, the combination, with the transmitter of the telephone-outfit, of a non-conducting test-plug for said switch having metallic ferrule thereon and metallic rod through the same, said rod and ferrule being in independent connection with the calling-battery and with the receiver of said outfit, respectively, substantially as described.

JOSEPH JOHN O'CONNELL.

Witnesses:
JAMES H. PEIRCE,
GEO. P. FISHER, Jr.